(12) United States Patent
Dreier

(10) Patent No.: US 7,296,955 B2
(45) Date of Patent: Nov. 20, 2007

(54) DEVICE FOR EXAMINING THE PRECISION OF A CIRCULAR PATH WHICH IS TO BE EXECUTED BY A WORKING SPINDLE

(75) Inventor: Horst Dreier, Horb am Neckar (DE)

(73) Assignee: Dreier Lasermesstechnik GmbH, Horb ( * ) Notice: Subject to any disclaimer, the term of this patent is extended or adjusted under 35 U.S.C. 154(b) by 0 days.

(21) Appl. No.: 11/709,082

(22) Filed: Feb. 22, 2007

(65) Prior Publication Data

US 2007/0212181 A1    Sep. 13, 2007

(30) Foreign Application Priority Data

Feb. 23, 2006  (DE) .................. 10 2006 009 422

(51) Int. Cl.
*B23C 9/00* (2006.01)
*B23Q 17/00* (2006.01)
*B23Q 17/22* (2006.01)

(52) U.S. Cl. .................. 409/218; 33/502; 33/503; 33/642

(58) Field of Classification Search ............ 409/187, 409/194, 207–208, 218, 210, 214; 33/502–503, 33/642, 556; 408/13, 8, 16, 75; 73/1.79
See application file for complete search history.

(56) References Cited

U.S. PATENT DOCUMENTS

| 4,435,905 A | 3/1984 | Bryan .................. 33/613 |
| 4,982,504 A | 1/1991 | Soderberg et al. ............ 33/502 |
| 5,111,590 A | 5/1992 | Park ............................ 33/502 |
| 5,214,857 A | 6/1993 | McMurtry et al. ............ 33/502 |
| 5,259,120 A | 11/1993 | Chapman et al. ............. 33/502 |
| 5,791,843 A | 8/1998 | Dreier ........................ 409/218 |
| 5,813,128 A | 9/1998 | Bailey ........................ 33/502 |
| 6,269,544 B1 | 8/2001 | Pahk et al. ................... 33/502 |
| 6,772,619 B2 | 8/2004 | Nashiki et al. ............... 73/1.79 |
| 7,040,033 B2 | 5/2006 | Zhu et al. ..................... 33/502 |

FOREIGN PATENT DOCUMENTS

| DE | 41 10 741 | 12/1991 |
| DE | 29512250 U1 | 11/1995 |
| EP | 258471 A1 | 3/1988 |

*Primary Examiner*—Erica Cadugan
(74) *Attorney, Agent, or Firm*—Paul Vincent

(57) ABSTRACT

The invention concerns a device for examining the precision of motion of a working spindle of an NC-controlled machine tool along a circular path for producing circular cylindrical surfaces on workpieces, comprising a first device part which can be coaxially mounted to the working spindle, a second device part which can be positioned on a machine table, which receives a workpiece to be processed, coaxially to the axis of a circular cylindrical surface to be produced on the workpiece, an electronic measuring value sensor which extends radially with respect to the axes of working spindle and circular cylindrical surface and is hinged to both device parts, and a shaft encoder which is rotatably disposed in the second device part coaxial relative to the axis of the circular cylindrical surface to be produced to determine the angular position of the measuring value sensor, wherein the measuring value sensor is held on one of the two device parts such that it can be adjusted and fixed transversely to the axes of the working spindle and the circular cylindrical surface.

7 Claims, 7 Drawing Sheets

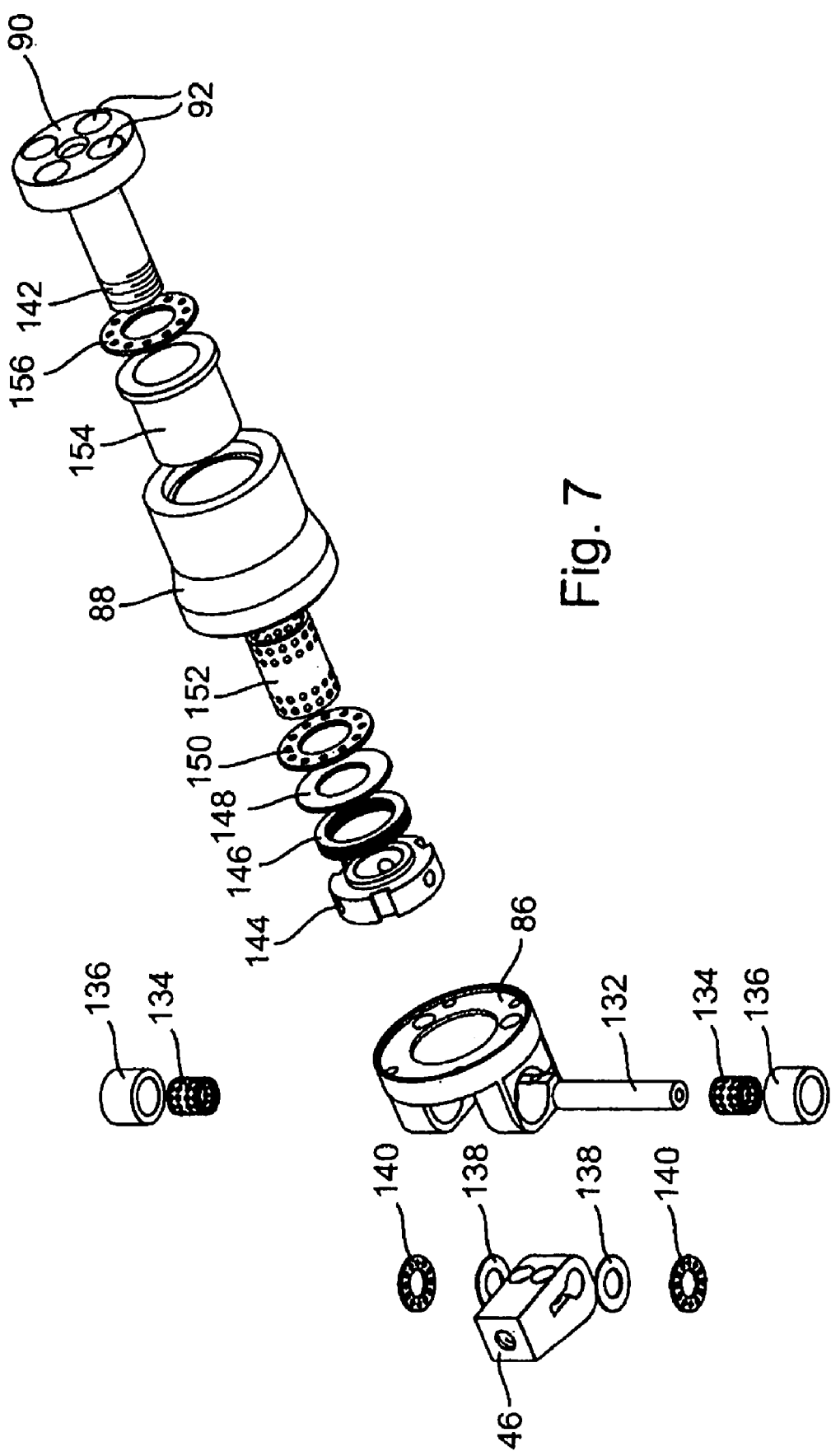

DEVICE FOR EXAMINING THE PRECISION OF A CIRCULAR PATH WHICH IS TO BE EXECUTED BY A WORKING SPINDLE

This application claims Paris Convention priority of DE 10 2006 009 422.0 filed on Feb. 23, 2006.

BACKGROUND OF THE INVENTION

The invention concerns a device for examining the precision of the motion of a working spindle of an NC-controlled machine tool along a circular path for producing circular cylindrical surfaces on workpieces, in accordance with the preamble of claim 1.

There are conventional devices of this type, which form the subject matter of DE 295 12 250 U1.

The device advantageously avoids the need for different reference cylinders to examine the precision of different diameters of circular cylindrical surfaces.

However, the device is only suited to examine one single circular path diameter due to the defined separation of the link points of the measuring sensor extending radially relative to the axes of the working spindle and the circular cylindrical surface to be produced.

It is therefore the underlying purpose of the invention to further develop a device of the above-mentioned type in such a fashion that it can examine the precision of different circular path diameter sizes.

This object is achieved in accordance with the invention by the characterizing features of the independent claim.

SUMMARY OF THE INVENTION

The adjustable and fixable mounting of one of the two parts of the measuring value sensor to one of the two device parts, transversely with respect to the axes of the working spindle and the circular cylindrical surface, permits determination, within a predetermined maximum distance of both axes, of the precision of different diameters of circular cylindrical surfaces to be produced or the precision of the travel of the circular path along which the working spindle must be guided about the center of a circular cylindrical surface, without having to mount additional extensions. Extensions are disadvantageous in that they permit examination only of fixed, defined diameters of circular cylindrical surfaces. In accordance with the invention, the mounting must not be adjusted in steps, but can be adjusted continuously up to a diameter of 1200 mm and, in particular, at a separation of $1/100$ mm. Thus, the invention can measure circular cylindrical surfaces whose diameters differ in a range of up to $1/100$ mm. Towards this end, the device part that can be fixed to the machine table, in particular, by magnetic force, thereby forming an installation unit, must be correspondingly positioned in a radial direction towards the working spindle relative to the other device part which is fixed to the spindle side. The device part may also be fixed using clamping jaws, screws or a clamping device.

The particular design of the measuring value sensor for variable installation of the device for circular path examination of the working spindle may vary. In one preferred embodiment of the invention, a clamping device, which receives the partial piece, is provided on the device part which is adjustably connected to the partial piece of the measuring value sensor, the clamping device being pivotable about an axis which is perpendicular to the working spindle axis and to the longitudinal axis of the measuring value sensor.

In one embodiment of the measuring value sensor in accordance with the invention, a partial piece of the measuring value sensor forms a stable adjustable measuring arm which has a circular cylindrical cross-section, and is cylindrically hollow over at least part of its length for installation of the measuring value sensor components therein.

Threaded adjusting nuts can be provided as adjusting means of the measuring value sensor which can be urged against opposite sides of the clamping device and are guided on an outer thread of its measuring arm. These adjusting means provide exact diameter adjustment of the circular cylindrical surfaces. In a further improvement, the measuring arm and the clamping device are designed such that the measuring arm length which is effective for diameter examination can be easily determined via indices.

In a further preferred embodiment of the invention, the measuring arm of the measuring value sensor can be replaced by others having a different length. The device can thereby be adjusted quickly and easily to different measuring tasks or measuring distances.

In one construction variant, the measuring arm can be extended by partial arm pieces that can be axially joined. This is advantageous in that measuring arms of different lengths are not required and in case of damage, the measuring arm can be easily exchanged or replaced by others having different measuring paths, e.g. +1, +2, +5, +10 mm.

Finally, the measuring value sensor may also be combined with a measuring arm, such that only the latter is adjustably held on a device part.

BRIEF DESCRIPTION OF THE DRAWING

Further advantages, features and details of the invention can be extracted from the following description which describes in detail a particularly preferred embodiment with reference to the drawing. The features shown in the drawing and mentioned in the description and the claims may thereby be essential to the invention either individually or collectively in arbitrary combination.

FIG. 7 shows an exploded view of the support for the clamping member.

DESCRIPTION OF THE PREFERRED EMBODIMENT

Figure 1:
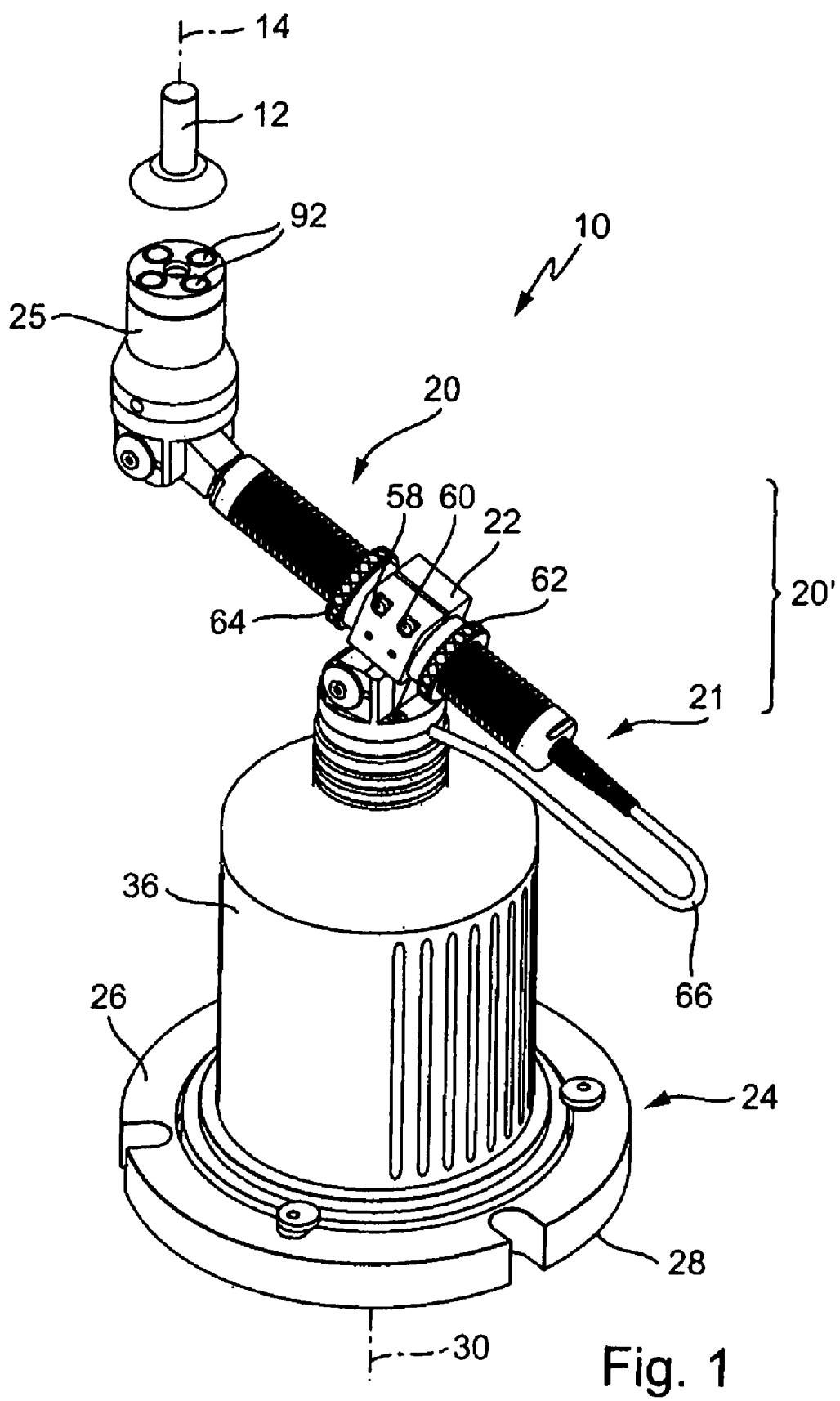
FIG. 1 shows a perspective view of the inventive device.
Figure 2:
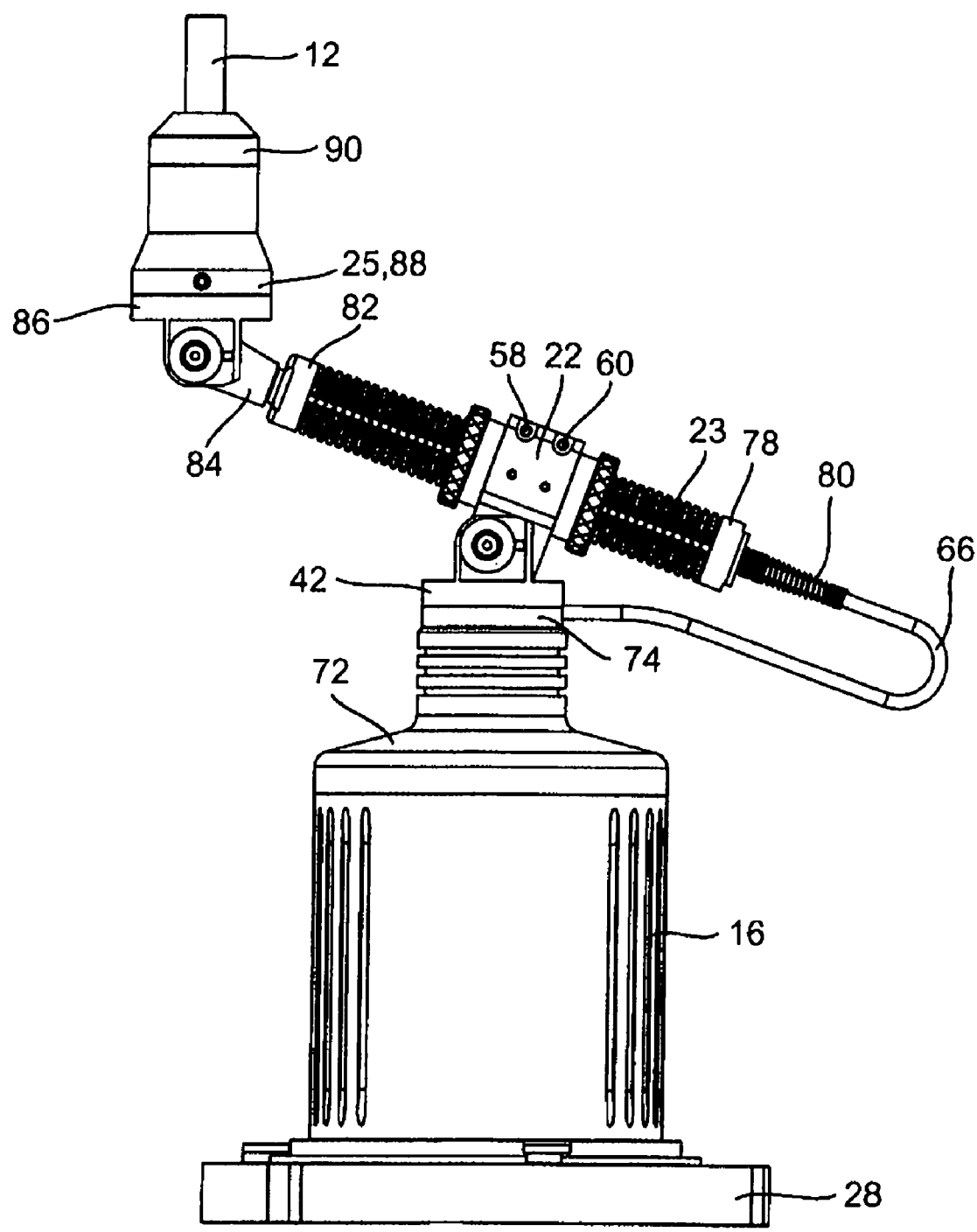
FIG. 2 shows a side view of the device.

FIGS. 1 and 2 show an embodiment of a measuring value sensor, designated in total with 21, of an examination device 10, with one device part of the examination device 10 being fixed to a machine table of a machine tool.

Only one device part is shown and bears a partial piece 20' of the measuring value sensor 21 forming the measuring arm 20. It is thereby noted that further constructive features of the examination device 10 are given in DE 295 12 250 U1 which discloses all details of the device part, designated in total with 24, which is to be mounted on the table side, except for the measuring arm 20 and its clamping device 22.

Analogous to this conventional examination device, the device part 24 (called installation unit below) which is to be provided on the table side (see DE 295 12 250 U1) has an associated clamping member 12 forming the further device part, which is to be mounted e.g. in clamping jaws of a working spindle in an NC-controlled machine tool.

The measuring arm 20, hinged to the clamping member 12, extends radially relative to the spindle axis 14 and is held via the clamping device 22 on the installation unit 24, such that it can be adjusted in the longitudinal direction.

The installation unit 24 must be oriented on the clamping surface 26 of a machine table 28, which receives it, or optionally on a clamping angle provided thereon, such that the geometrical longitudinal axis 30 of the installation unit 24 is exactly located at that position where the geometrical axis of a circular cylindrical workpiece surface to be finished or optionally reworked e.g. through cutting such as milling, is located during processing of the workpiece.

For processing thereof, the clamping member of the examination device on the clamping jaws of the working spindle must be replaced by a corresponding processing tool.

In view of the positioning requirements of the two device parts for the circular path of tool advance motion to be tested, reference is made to the corresponding very extensive explanations in the above-mentioned utility model.

A shaft encoder 32, preferably designed as an angular encoder is integrated in the installation unit 24, coaxially with respect to the longitudinal axis 30, and preferably has a reference marking and/or direction recognition. It is thereby possible to exactly determine the zero point of the rotary motion of the measuring value sensor 21 and also the rotary direction and rotary speed. In this fashion, its angular position can be precisely detected.

Figure 3:
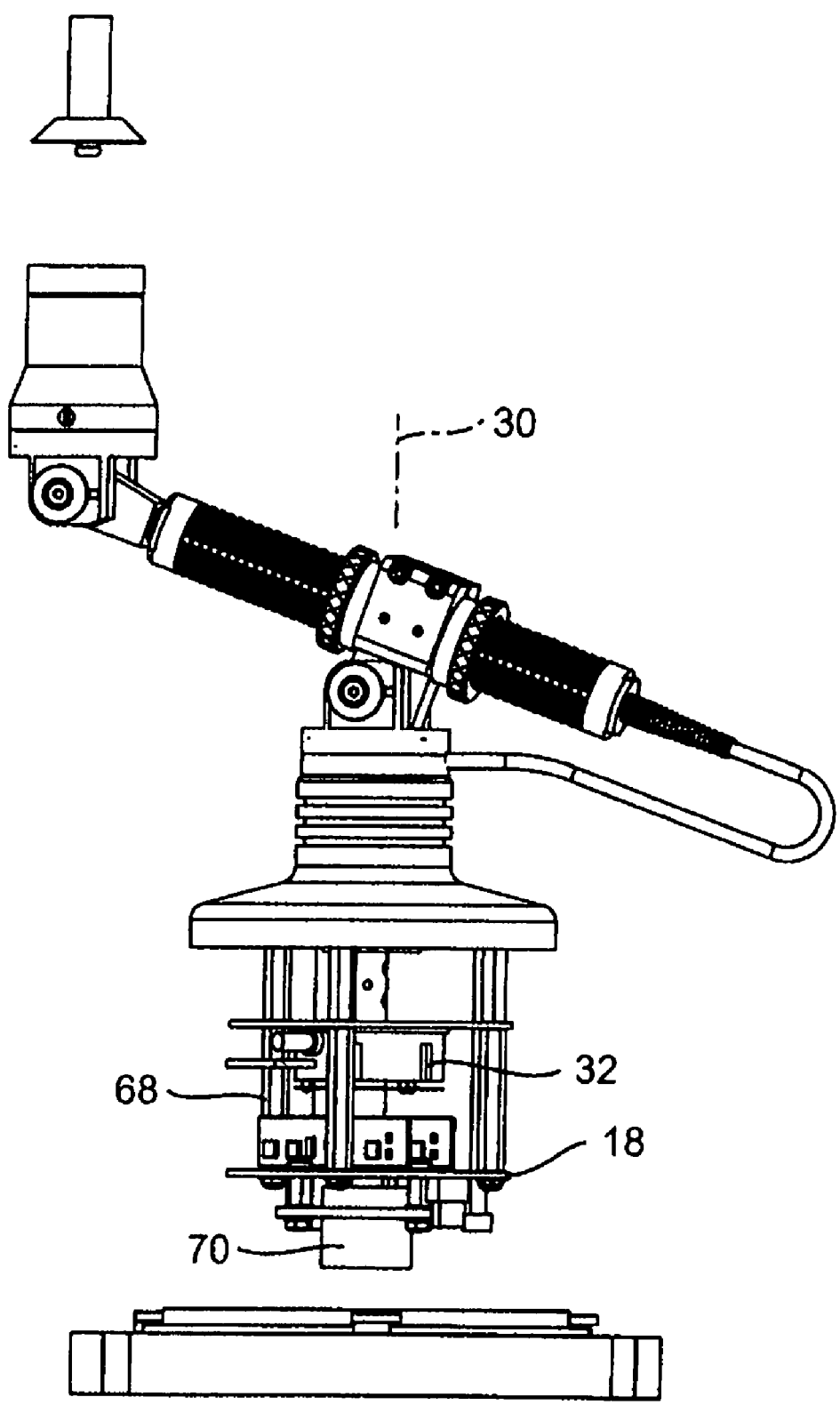
FIG. 3 shows a view in accordance with FIG. 2 with open jacket tube.
Figure 4:
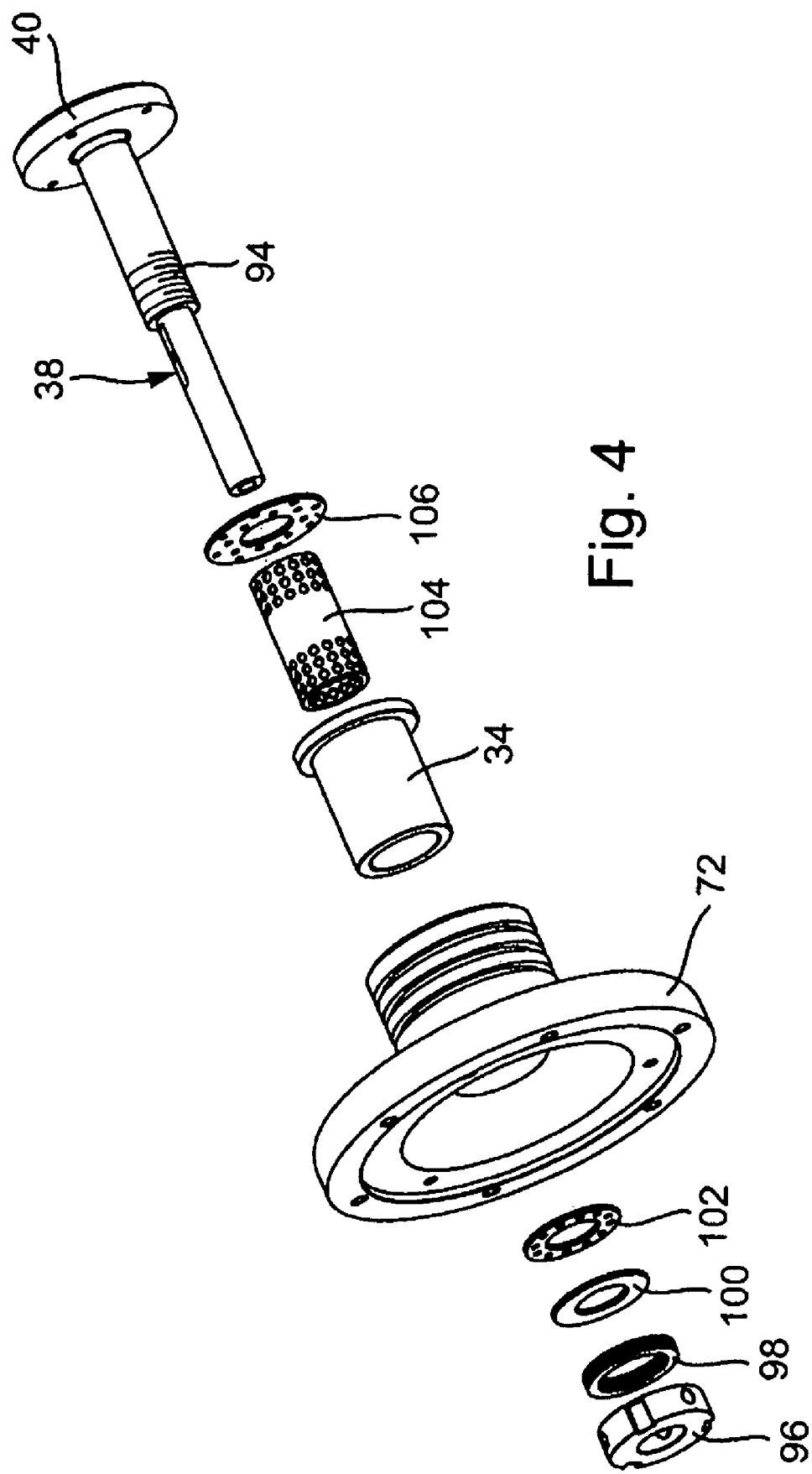
FIG. 4 shows an exploded view of the bell.

FIG. 3 shows the device part 24 without jacket tube 16, so that the shaft encoder 32, a board 18 with electronics, a board mounting 68 and an encased slip ring 70 for signal transmission are visible. FIG. 2 shows a bell 72 which seats on the jacket tube 16 and closes it at the top, through which a main shaft 74 penetrates. This is shown in detail in FIG. 4. The main shaft 74 supports a main joint 76 which, in turn, is shown in more detail in FIG. 5. The measuring value sensor 21 has a system tube 23 which is closed at the lower end by a tube cap 78 through which a measuring system cable 66 is guided via a buckling protection 80, which is guided through the main shaft 74 to the slip ring 70. The other end of the system tube 23 is closed by a further tube cap 82. It is followed by a jointed piece 46 which bears a further main joint 86 (FIG. 7), which bears the device part 25 with housing head 88, head shaft 90 and clamping member 12. The head shaft 90 has magnets 92 as protection against breakage (FIG. 1).

An adjusting shaft 38 is disposed in a bushing 34 and guided out of the housing 36 of the installation unit 24 to bear a receiving flange 40 on the outer side of the housing, to which a bearing device 42 for the measuring value sensor 21 is mounted. The shaft 38 serves for rotary displacement of the shaft encoder 32 (see FIG. 4). The bearing device 42 has a jointed shaft 44 defining a pivot axis, about which the clamping device 22 is disposed to be freely pivotable. The shaft encoder 32 has reference points and serves as a pulse generator with a resolution of 6000 pulses per revolution. The steel shaft 38 has an outer fixing thread 94 onto which an adjustment nut 96, having safety screws that can be tightened in a radial direction, is screwed. Axial play is compensated for by an axial spring 98 against which a face plate 100 and a ball washer 102 abut. The steel shaft 38 is rotatably disposed in a radial ball cage 104. A ball washer 106 is also seated on the end face of the ball bushing 34.

Figure 5:
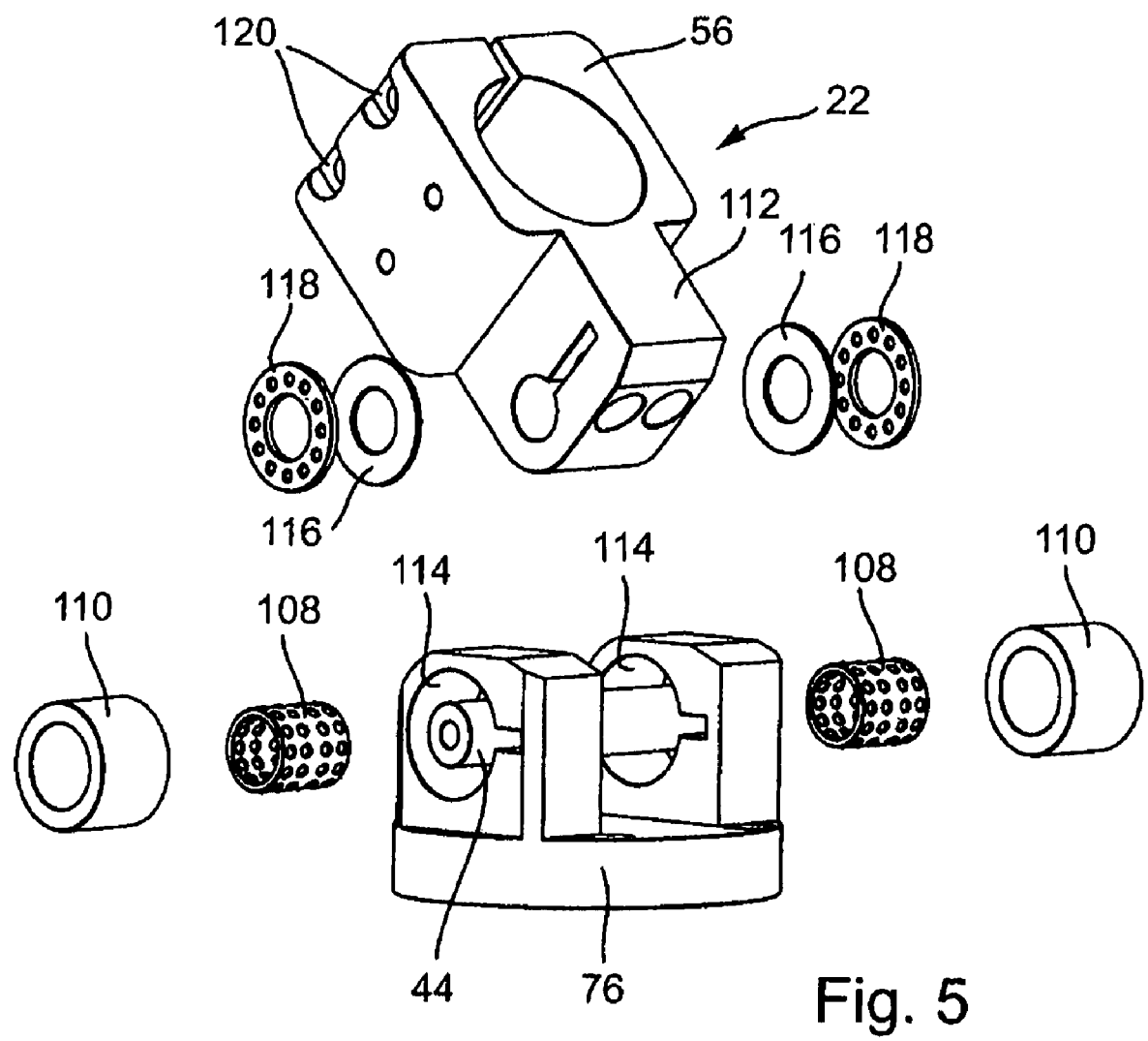
FIG. 5 shows an exploded view of the main joint.

FIG. 5 shows the pivot bearing of the measuring arm 20 with main joint 76 and clamping block 56 which is pivotably disposed in the main joint 76 using the jointed shaft 44. The bearing in each eye 114 is realized via a radial ball cage 108 and a ball bushing 110. The clamping block 56 is seated with a clamping section 112 between the eyes 114 with the jointed shaft 44 penetrating therethrough. It is borne in the axial direction via face plates 116 and ball washers 118. The clamping block 56 also has clamping bores 120 which receive clamping screws 58 and 60.

A coil 48 which is coaxially inserted into the measuring arm 20 and a ferromagnetic core 50 which is axially displaceably guided in the coil 48 are integrated in the measuring arm 20 which forms one partial piece of the measuring value sensor 21 in the present embodiment. The ferromagnetic core 50 projects with one threaded bolt 52 from one measuring arm front face. The threaded bolt 52 receives the jointed piece 46 for articulated connection of the measuring arm 20 or the core 50 to the further device part which is to be mounted in the working spindle and forms the clamping member.

Figure 6:
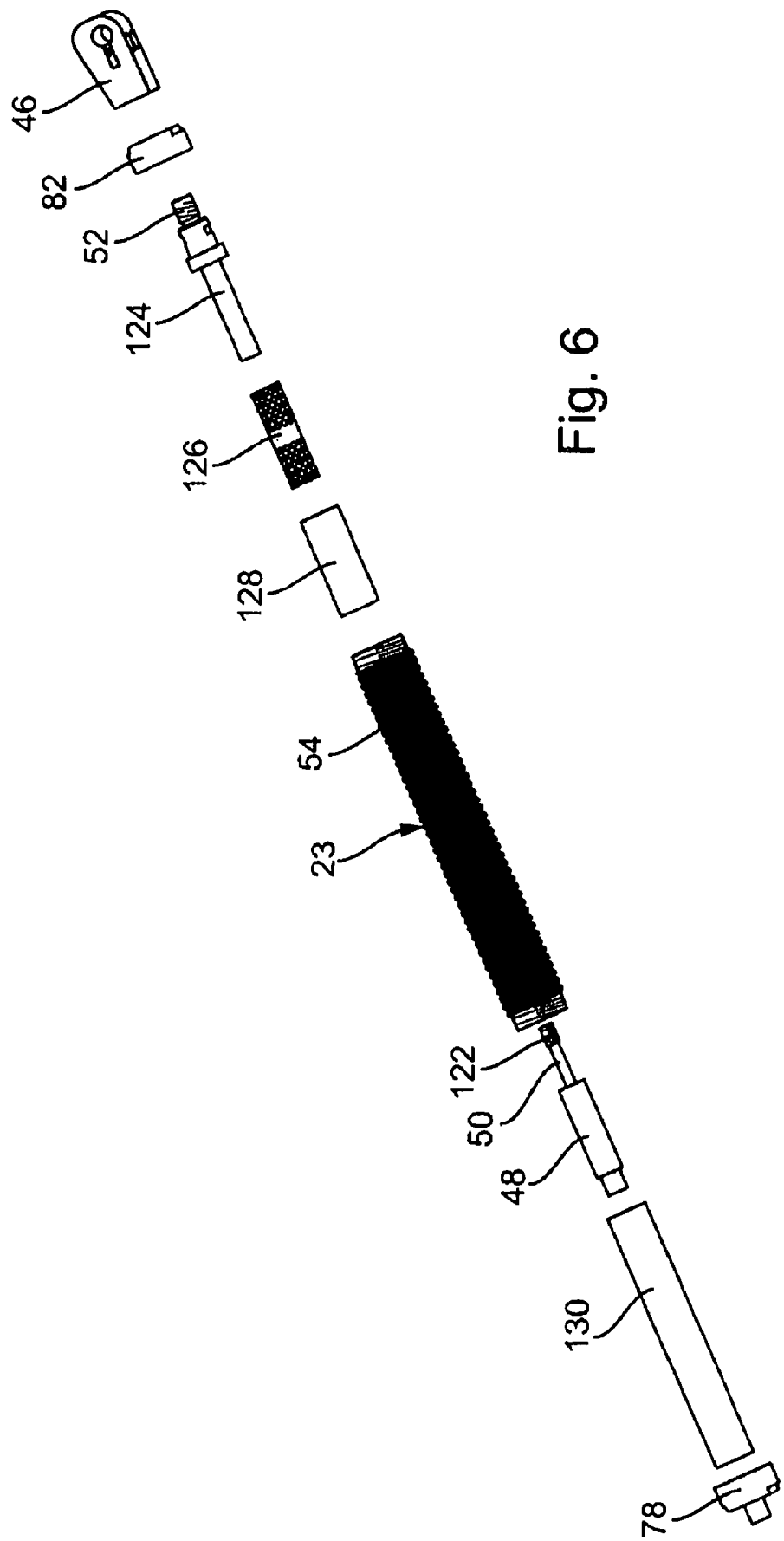
FIG. 6 shows an exploded view of the measuring arm.

The measuring arm 20 comprises the system tube 23 which is preferably formed as a hollow profile having a circular cylindrical cross-section (FIG. 6), which bears an outer thread 54 and is guided in the clamping device 22 such that it can be axially displaced and fixed. Towards this end, the latter has a slotted clamping block 56 holding the measuring arm 20, which realizes a press-fit using the clamping screws 58, 60 for fixing the measuring arm. The measuring system, in particular the core 50, is borne in that the core 50 has a thread 122 and is screwed into a receiving mandrel 124. The receiving mandrel 124 is seated in a ball cage 126 which is held by a ball bushing 128. The ball bushing 128 is axially fixed by a spacer tube 130.

Two threaded adjusting nuts 62, 64 which are screwed onto the outer thread 54 of the measuring arm 20 and can be urged against opposing front faces of the clamping block 56, are provided for fine axial adjustment of the measuring arm 20.

An electric connecting device for the measuring value sensor 21 in the form of the measuring system cable 66 is provided on the measuring arm front face opposite to the threaded bolt 52.

The device part 25 is shown in detail in FIG. 7. The second main joint 86 is pivotably mounted to the jointed piece 46 via a jointed shaft 132, two ball cages 134, and two ball bushings 136 and two face plates 138 and two ball washers 140. The head shaft 90 has an outer thread 142 for fixing thereof, onto which an adjusting nut 144, having safety screws which can be radially tightened, is screwed. Axial play is compensated for by an axial spring 146, against which a face plate 148 and a ball washer 150 abut. The head shaft 90 is rotatably disposed in a radial ball cage 152 which, in turn, is rotatably disposed in a ball bushing 154. A ball washer 156 is also supported on the front face of the ball bushing 154.

In order to extend the measuring arm 20, a corresponding arm extension part can be screwed onto the threaded bolt 52, which, in turn, may be formed from a plurality of extension partial pieces of the same or different lengths which can be combined with each other.

The axial adjustability of the measuring arm 20 permits installation of the examination device in correspondence with the given distance of the geometrical axes of working spindle and circular cylindrical surface to be produced, on a workpiece, thereby examining the precision of circular path diameters of different sizes along which the working spindle is moved during processing of a workpiece.

I claim:

1. A device, supported on a machine table, for examining a precision of motion of a working spindle of an NC-controlled machine tool along a circular path for producing circular cylindrical surfaces on a workpiece, the device comprising:
- a first device part for coaxial mounting to the working spindle;
- a second device part for positioning on the machine table to receive the workpiece, the workpiece being processed coaxially with respect to an axis of the circular cylindrical surface being produced thereon;
- an electronic measuring value sensor which extends radially with respect to an axis of the working spindle and with respect to the axis of the circular cylindrical surface, said sensor being hinged to said first device part and to said second device part;
- a shaft encoder rotatably disposed in said second device part and coaxial to the axis of the circular cylindrical surface, said encoder determining an angular position of said measuring value sensor; and
- means for holding said measuring value sensor on one of said first and said second device parts to adjust and fix said working sensor transversely to the axis of the working spindle and to the axis of the circular cylindrical surface.

2. The device of claim 1, wherein said holding means comprises a clamping device which receives said sensor, said clamping device being disposed on one of said first and said second device parts, said clamping device being adjustably connected to said measuring value sensor and pivotable about an axis which is perpendicular to a working spindle axis and to a longitudinal axis of said measuring value sensor.

3. The device of claim 2, wherein said sensor comprises a first and a second section defining a measuring arm, wherein one of said first and said second sections is held on said second device part to be adjusted in length and pivoted.

4. The device of claim 3, wherein said holding means comprises threaded nuts for adjusting said measuring value sensor, said nuts being urged against opposite sides of said clamping device and guided on an outer thread of said measuring arm.

5. The device of claim 4, wherein said measuring arm and said clamping device have indices for determining a radial separation between the axis of the working spindle and the axis of the circular cylindrical surface.

6. The device of claim 5, wherein said measuring arm is structured for replacement by other measuring arms having differing lengths.

7. The device of claim 5, wherein said measuring arm is structured for extension using partial arm pieces that are axially joinable.

* * * * *